United States Patent [19]

Tokuhara et al.

[11] Patent Number: 4,586,814
[45] Date of Patent: May 6, 1986

[54] VARIABLE POWER PROJECTING DEVICE

[75] Inventors: Mitsuhiro Tokuhara, Chigasaki; Setsuo Minami, Kawasaki, both of Japan

[73] Assignee: Canon Kabushiki Kaisha, Tokyo, Japan

[21] Appl. No.: 535,700

[22] Filed: Sep. 26, 1983

[30] Foreign Application Priority Data

Oct. 5, 1982 [JP] Japan .................. 57-175853

[51] Int. Cl.4 .............................. G03B 27/52
[52] U.S. Cl. ...................... 355/55; 350/425
[58] Field of Search ................. 355/55; 350/425

[56] References Cited

U.S. PATENT DOCUMENTS 3,728,010  4/1973  Mikami ................. 350/425
4,171,904 10/1979  Tani ..................... 355/55
4,284,346  8/1981  Ikeda et al. ............ 355/67

Primary Examiner—Monroe H. Hayes
Attorney, Agent, or Firm—Fitzpatrick, Cella, Harper & Scinto

[57] ABSTRACT

A projecting device for projecting an image of the surface of a body on a light receiving surface, in which optical element blocks are provided symmetrically with respect to a stop, of which the diameter of aperture is always constant in varying the magnification. The device includes a projecting optical system to change the focal length by symmetrically moving with respect to the stop at least a part or the whole of the optical element blocks, and means for restricting the field of the surface of a body, disposed between said projecting optical system and the surface of the body. The exposure amount on the light receiving surface is maintained substantially constant in varying the magnification by making the change of the focussing magnification of the projecting optical system to mainly correspond with the change of refractive power of the optical element blocks which are disposed on both sides of said stop.

6 Claims, 5 Drawing Figures

VARIABLE POWER PROJECTING DEVICE

BACKGROUND OF THE INVENTION

1. Field of the Invention

This invention relates to a projecting device capable of projecting on a light receiving surface an image of the surface of a body and continuously varying the focussing magnification of the image, and more particularly to a projecting device having an optical system capable of maintaining substantially constant the quantity of light even if the surface of the body is projected on a light receiving surface while the focussing magnification of the image is continuously varied.

2. Description of the Prior Art

Copying apparatus is widely known as a projecting device, which scans the surface of a body by a slit and continuously projects on the light receiving surface the slit image continuously. In conventional devices, when the image of the surface of a body to be projected on the light receiving surface is varied with its magnification, the intensity of illumination is varied on the light receiving surface so that in a copying apparatus where a photosensitive member is disposed at the light receiving surface, there occurs excess exposure or shortage of exposure. For compensating the change in amount of exposure, there have been proposed various methods, for example, varying the aperture of a stop as the magnification varies, or varying the width of the slit for scanning. However, these methods are mechanical so that the apparatus becomes complex and bulky.

Instead of the above mentioned compensation methods, U.S. Pat. No. 4,171,904 discloses a variable power copying apparatus which, without using a mechanical method, compensates the amount of exposure at the photosensitive surface. In this apparatus, the width of a mirror disposed near to an original to be copied is adjusted to maintain the exposure amount at the photosensitive surface approximately constant. In precise meaning, as described later, it is not possible, in principle, to obtain a constant exposure amount, so that fine control for maintaining constant exposure amount is not expected.

SUMMARY OF THE INVENTION

The main object of this invention is to provide a projecting device having an optical system capable of maintaining substantially constant exposure amount on the light receiving surface when the magnification is varied, without using mechanical compensation means.

This object is achieved in the present invention by providing means for compensating the change of exposure amount on the light receiving surface as magnification is varied mainly within the focussing optical system per se.

In the projecting device of the present invention, the projecting optical system for projecting an image of the surface of a body on the light receiving surface comprises optical elements symmetrically disposed with respect to a stop, a part or whole of the optical elements disposed on both sides of the stop being move symmetrically relative to the stop for changing magnification. The diameter of the stop provided in the projecting optical system is always kept constant during magnification operation. Further means for restricting the field of the surface of a body in the slit shape is provided between the projecting optical system and the surface of the body, and in response to the change of the focussing magnification $\beta$ of the projecting optical system, mainly, refracting power, i.e., the inverse of the focal length, of each block of the optical elements disposed at both sides of the projecting optical system is changed to a predetermined value so as to prevent the change of the quantity of light amount on the light receiving surface.

DESCRIPTION OF THE PREFERRED EMBODIMENT

Figure 1:
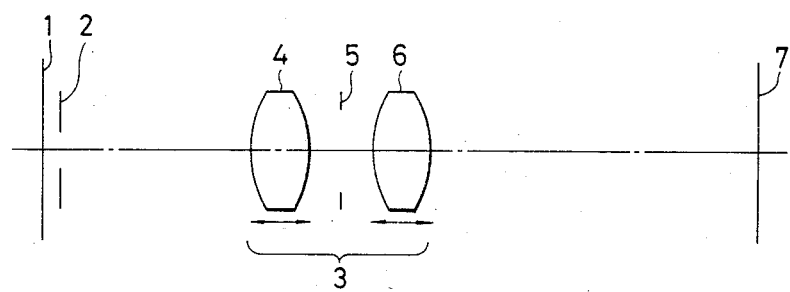
FIGS. 1 and 2 the basic structure of the projecting device according to this invention.

FIG. 1 shows an outline of the device according to this invention, in which 1 denotes the surface of a body, e.g., an original to be copied, 2 is a slit to restrict the field of the surface of the body 1, 3 is a projecting optical system capable of continuously varying the focussing magnification and providing with lens blocks 4 and 6 having symmetrical dimension relative to the stop 5 and having equal power, and 7 is a light receiving surface of, for example, a photosensitive medium. In the projecting optical system 3, a part or whole of the optical elements constituting lens blocks 4 and 6 are symmetrically moved in the arrow indicated directions as shown in FIG. 1 with respect to the stop 5 for varying the focal length, in other words, refracting power. For maintaining an optically conjugate relation between the surface 1 of the body and the light receiving surface 7, the projecting optical system 3 is moved and a reflecting mirror (not shown) disposed between the surface of a the body and the light receiving surface is moved, or only the projecting optical system 3 is moved, while the optical path length between the surface of the body and the light receiving surface is maintained constant.

The slit 2 for restricting the field of the surface 1 of a body is preferably disposed in the vicinity of the surface of the body. It is possible to space the slit 2 from the surface of the body within the range of several tens of percent in general, the range being changed depending on the instruction of the products and being the tolerance range which the change of amount of exposure of an image of the surface of a body permits.

Figure 2:
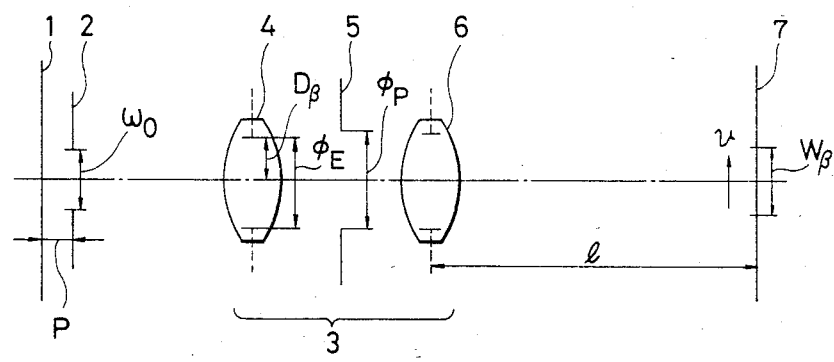

FIG. 2 shows the focussing relation assuming that the focussing magnification of the projecting optical system in FIG. 1 is $\beta$. In FIG. 2, if the slit width of slit means 2 disposed in the vicinity of the surface of the body 1 is $W_o$, exposure width on the light receiving surface 7 is $W_\beta$, diameter of the stop 5 is $\phi_P$, radius of entrance pupil is $D_\beta$, diameter of entrance pupil is $\phi_E$, focal length of the projecting optical system is $f_\beta$, constant moving speed of the light receiving surface is $v$, then exposure amount $K_\beta$ becomes $$K_\beta = E \cdot W_\beta \cdot \left( \frac{D_\beta}{f_\beta \cdot (1 - \beta)} \right)^2 \cdot \frac{1}{v} \quad (1)$$

where E is a constant determined by intensity of illumination on the surface of a body etc.

Now, when the distance P between slit means 2 and the surface of the body 1 has the relation with the distance 1 between the exit pupil and the light receiving surface 7 of $|P| << 1$, it is possible to represent $$W_\beta \approx \beta W_o \tag{2}$$

And assuming that pupil magnification is $\beta_S$, then from the definition $$\beta_S = \phi_P/\phi_E$$

therefore $$\phi_E = 2D_\beta = (1/\beta_S)\phi_P \tag{3}$$

In equation (1), the term which varies as focussing magnification $\beta$ varies is $$W_\beta \left( \frac{D_\beta}{f_\beta \cdot (1-\beta)} \right)^2 \tag{4}$$

so that, equation (4) is changed using equations (2) and (3) to $$W_\beta \cdot \tag{5}$$

$$\left\{ \frac{D_\beta}{f_\beta(1-\beta)} \right\}^2 = \left[ \beta \cdot \left( \frac{1}{f_\beta(1-\beta) \cdot 2\beta_S} \right)^2 \right] \cdot W_o \cdot \phi_P^2$$

Since $W_o$ and $\phi_P$ are constant regardless of the value of $\beta$, therefore, the term to be examined is the value of $$\left[ \beta \cdot \left( \frac{1}{f_\beta(1-\beta) \cdot 2\beta_S} \right)^2 \right]$$

in equation (5).

As the projecting optical system 3 is a symmetrical optical system with respect to the stop, there is a relation between $\beta_S$ and $f_\beta$ of $$1/f_\beta \Phi_\beta = 2\beta_S \cdot \beta \tag{6}$$

where $\phi_\beta$ is refracting power of the whole system, and $\beta$ is the refracting power of the lens block 4 disposed before the stop 5, which is also the refracting power of the lens block 6 disposed after the stop 5. Now if equation (6) is substituted to said value to be examined, then we obtain $$\beta \cdot \left( \frac{1}{f_\beta \cdot (1-\beta) \cdot 2\beta_S} \right)^2 = \beta \cdot \left( \frac{\phi_\beta}{(1-\beta)} \right)^2 =$$

$$\left[ \frac{\phi_\beta^2}{\left\{ \frac{1}{2}\left( \beta + \frac{1}{\beta} \right) - 1 \right\}} \right] \times \frac{1}{2}$$

Consequently, the exposure amount can be maintained constant regardless of the value $\beta$ if the value of the square-braketed expression in equation (7) is made to have a practically constant value.

According to equation (7), $$\frac{1}{2}\left( \beta + \frac{1}{\beta} \right) - 1$$

is determined directly relative to the change of $\beta$, so that it is only necessary to change the value of $\beta$ so as to make the ratio of $$\frac{1}{2}\left( \beta + \frac{1}{\beta} \right) - 1$$

to $\beta^2$ become substantially a definite or constant value.

In the foregoing explanation, we have used the approximate relation of equation (2), however, in practice, since the dominating factor to change the exposure amount resides in equation (7), so that it should be said that, in practice, changing the value of $\beta$ to make the ratio of $$\frac{1}{2}\left( \beta + \frac{1}{\beta} \right) - 1$$

to $\beta^2$ a definite value results in no change in the exposure amount. In the optical system used in U.S. Pat. No. 4,171,904, $\beta$ in equation (7) does not change and $\beta$ is changed to make the value of $$\left[ \frac{\phi_\beta^2}{\left\{ \frac{1}{2}\left( \beta + \frac{1}{\beta} \right) - 1 \right\}} \right]$$

within the tolerance range, consequently, there is a limitation in usable range of $\beta$, as the change of denominator in this equation is determined merely by the selection of $\beta$.

Figure 3:
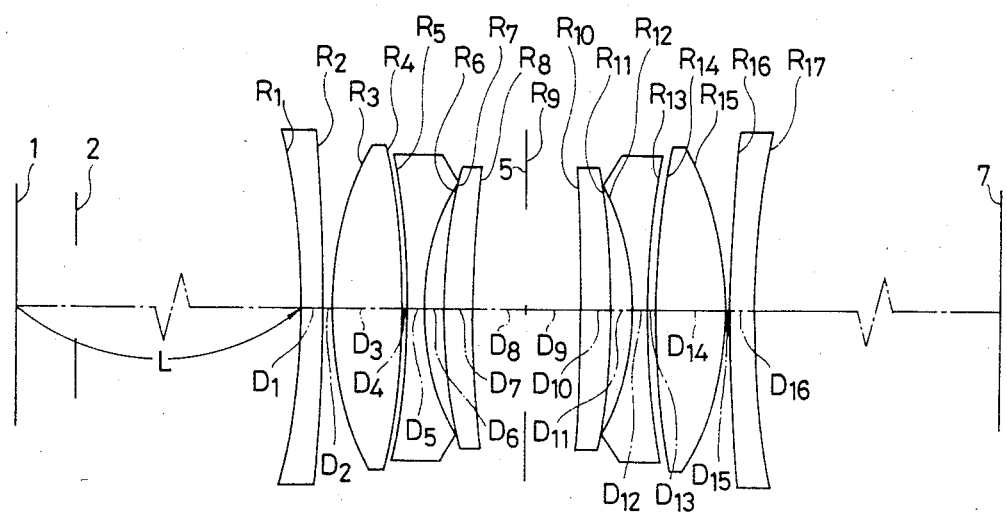
FIG. 3 shows an embodiment of the projecting device of this invention.

FIG. 3 shows an embodiment of this invention. The projecting lens system is arranged symmetrically relative to the stop 5 and the lens group of one side of the stop 5 is a zoom lens of orthometer type consisting of four lenses. Three lenses near to the stop 5 on both sides, i.e., in each of the two lens groups, symmetrically move relative to the stop 5 so as to effect a zooming operation. The zoom lenses change their focal length and move in the direction of the optical axis for maintaining the surface of the body 1 and the light receiving surface 7 optically conjugate. In the zoom lenses as shown in FIG. 3, even though the focal length changes, the optical path length between surfaces 1 and 7 is kept always constant. In FIG. 3, Ri denotes the radius of curvature of the ith surface as viewed from the object side, and Di denotes the air space on the optical axis between the ith and (i+1)th surfaces. The 9th surface is the stop, and $\nu_i$ and Ni show the dispersion value and the refractive index of the ith lens;

| | | | |
|---|---|---|---|
| R1 = −141.56 | D1 = 3.30 | N1 = 1.49 | $\nu_1$ = 57.40 |
| R2 = −594.13 | D2 = variable | | |
| R3 = 56.82 | D3 = 12.00 | N2 = 1.70 | $\nu_2$ = 41.20 |
| R4 = −135.18 | D4 = 1.06 | | |
| R5 = −124.69 | D5 = 2.70 | N3 = 1.64 | $\nu_3$ = 34.50 |
| R6 = 46.33 | D6 = 3.18 | | |

-continued

| | | | |
|---|---|---|---|
| R7 = 108.79 | D7 = 5.50 | N4 = 1.72 | ν4 = 43.70 |
| R8 = 652.03 | D8 = variable | | |
| R9 = 0(stop) | D9 = variable | | |
| R10 = −652.03 | D10 = 5.50 | N5 = 1.72 | ν5 = 43.70 |
| R11 = −108.79 | D11 = 3.18 | | |
| R12 = −46.33 | D12 = 2.70 | N6 = 1.64 | ν6 = 34.50 |
| R13 = 124.69 | D13 = 1.06 | | |
| R14 = 135.18 | D14 = 12.00 | N7 = 1.70 | ν7 = 41.20 |
| R15 = −56.82 | D15 = variable | | |
| R16 = 594.13 | D16 = 3.30 | N8 = 1.49 | ν8 = 57.40 |
| R17 = 141.56 | | | |

| Focussing Magnification | Focal Length of The Whole System | D2, D15 | D8, D9 | Distance L between The Surface 1 of the Body and R1 surface |
|---|---|---|---|---|
| 1.00 | 227.632 | 0.90 | 8.63 | 454.86 |
| 1.212 | 225.376 | 1.74 | 7.87 | 410.86 |
| 0.786 | 223.994 | 2.30 | 7.31 | 508.73 |
| 0.756 | 222.782 | 2.81 | 6.80 | 517.05 |
| 0.667 | 217.633 | 5.00 | 4.61 | 543.76 |
| 0.636 | 215.311 | 6.00 | 3.62 | 553.38 |

Distance between the surface 1 of the body and image surface 7; 922.74

Distance P between the surface 1 and the slit 2; 28.0

Diameter $W_o$ of the slit 2; 7.7

Diameter $\phi_P$ of the stop 5; 33.5

Diameter $\phi_E$ of the entrance pupil; 37.9

Figure 4:
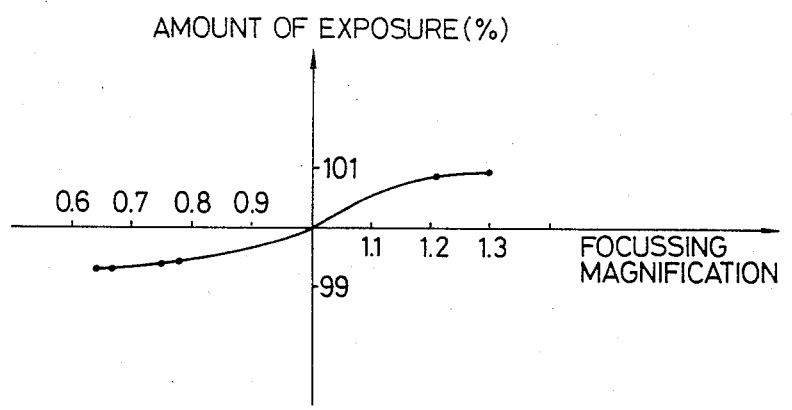
FIG. 4 shows the change of the amount of exposure relative to the focussing magnification.

FIG. 4 shows the change of exposure amount on the light receiving surface during magnification in the projecting system shown in FIG. 3, the ordinate showing the exposure amount and the abscissa showing focussing magnification, and the exposure amount taken at the focussing magnification of 1 is made 100 as an origin. As shown in FIG. 4, the change of exposure amount in response to the change of focussing magnification is within 1% for the range of magnification required usually, so that the exposure amount is kept constant excellently.

Figure 5:
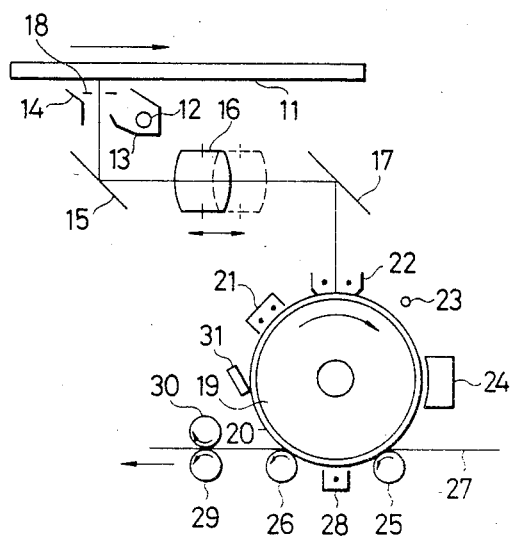
FIG. 5 shows an embodiment applying the present invention to a copying apparatus.

FIG. 5 shows an embodiment of a copy apparatus to which the present invention is applied. In FIG. 5, 11 is a platen glass on which an original is placed and moving in the direction of arrows in synchronism with the photosensitive drum mentioned below; 13 and 14 are reflecting members to collect the light from the light source 12 in the slit from the platen glass 11; 15 and 17 are fixed mirrors; 16 is the variable power lens system described in the foregoing for forming an image of an original on the photosensitive drum, which moves in the two-headed arrow direction, namely in the direction of the optical axis when focussing magnification is changed. For matching the end surface of the original image on the photosensitive member in case of varying magnification, the lens system 16 moves in the direction of the optical axis and may also be moved by a conventional method in a direction perpendicular to the optical axis within a plane parallel with the elongated direction of the slit 18, which is located in the vicinity of the platen and is a fixed slit controlling the exposure width on the photosensitive drum. Around the drum 19, there are a photosensitive member 20 comprising a conductive base, photoconductive layer, and a transparent insulating surface layer overlaid in this order; 21 and 22 are corona dischargers, respectively; 23 is a lamp; 24 is a developing device; 25 and 26 are rollers; 27 is a transfer paper; 28 is a corona discharger; 29 and 30 are rollers; and 31 is an elastic blade.

The drum 19 is rotated in the direction of the curved arrow by a motor (not shown). The photosensitive member 20 is given a uniform charge on its surface by the corona discharger 21; the polarity of the charge is positive in the case of an N type semiconductor photoconductive layer and negative in the case of a P type. Then, the photosensitive member 20 is given an image exposure by focussing optical system 16 and the discharge by the corona discharger 22 so as to form a charge pattern corresponding to the light image of an original on the photosensitive member. This photosensitive member is given uniform whole surface exposure by the lamp 23 and an electrostatic latent image of excellent contrast is formed thereon. The formed latent image is visualized as a toner image by developer 24 of a cascade type or a magnet-brush type. The visualized toner image is sent out by a supplying means (not shown) and is transferred to a transfer paper 27 which is contacted with the photosensitive member 20 by the rollers 25 and 26 and moved at the same speed as the photosensitive member 20. For improving the transfer efficiency at the position of transfer, the charge of a polarity opposite to the toner forming development is applied to the back of the transfer paper at the transfer position by the corona discharger 28. The toner image transferred to the transfer paper 27 is fixed by a suitable fixing device of, for example, heat fixing type provided with a pair of rollers 29 and 30 closely contacted with the transfer paper and then the paper is fed to containing means (not shown).

The toner remaining on the surface of the photosensitive member after the transfer has been finished is swept by the edge of the elastic blade 31 to be cleaned so that the surface is returned to the clean surface so as to be reused in the next image treating cycle. Although the discharge 22 is disposed to discharge the surface of the photosensitive member simultaneously with the image exposure, the discharge 22 may be disposed between the charger 21 and the focussing system to discharge the surface of the photosensitive member before image exposure. In this case lamp 23 is not required. Further the photosensitive member may not have insulating surface layer and in this case discharger 22 and lamp 23 are not necessary. In FIG. 5, the platen glass is moved but the present invention is applicable to a copying apparatus in which the platen for receiving an original is of a fixed type.

While the embodiment shown in the drawing has a slit plate for restricting the field image of an original surface, it may be replaced by an elongated reflecting member disposed along the surface of the original. This reflecting member may be a reflecting mirror of narrow width, which is made to coincide with the slit aperture width in case of slit plate. Consequently, in case of a conventional scanning system in which a movable mirror group moves at 2:1 speed ratio to scans the original surface, it is possible to obtain the same effect as the slit by selecting suitably the width of the moving mirror.

Further, according to the projecting device of this invention, it is easy to obtain the effect of maintaining the exposure amount constant when the distance between an object and its image is maintained definite when magnification is varied.

As explained in the foregoing, according to the projecting device of this invention, it is possible to obtain substantially constant exposure amount within mechanically moving a part of the optical system in synchronizing with the varying operation of magnification, and the degree of deviation from constant exposure amount is kept very low in comparing to the similar conventional devices.

What we claim is:

1. A variable power projecting device for projecting an image of the surface of a body onto a light receiving surface, comprising:

an optical system for focusing on the light receiving surface the image of information on the surface of the body, said optical system comprising first and second optical element blocks provided symmetrically with each other with respect to a stop, said optical element blocks each having at least a lens, and at least said one lens of each of said optical element blocks being moved symmetrically with respect to said stop for varying the focusing magnification of the image focused on the light receiving surface so that the change of refractive power of said optical element blocks resulting from the movement of said symmetrically moved lenses compensates for the change of the exposure amount on the light receiving surface in association with the change of the focusing magnification; and light restricting means disposed between said optical system and the surface of said body and in the vicinity of the surface of said body.

2. A variable power projecting device according to claim 1, wherein the whole of said optical system is integrally moved in the direction of an optical axis in association with the change of the focusing magnification.

3. A variable power projecting device according to claim 1, wherein said light restricting means comprises a member provided with a slit for restricting the field of the surface of said body.

4. A variable power projecting device according to claim 1, wherein said optical system comprises a zoom lens of orthometer type.

5. A variable power projecting device for projecting an image of the surface of a body onto a light receiving surface, comprising:

an optical system for focusing on the light receiving surface the image of the surface of the body, said optical system comprising first and second lens blocks, provided symmetrically with each other with respect to a stop, each said lens block having at least one lens, and at least one said one lens of each of said lens blocks being moved in the direction of an optical axis to change the refractive power of said optical system so that the value of the square of the reflective power $\beta$ of each said lens block is substantially proportional to the value of $(\frac{1}{2})(\beta + 1/\beta) - 1$ where $\beta$ is the focusing magnification of said optical system; and light restricting means disposed between said optical system and the surface of the body and in the vicinity of the surface of the body.

6. A variable power copying device comprising:

means for supporting an original;

photosensitive means on which the image of said original is focused;

a zoom lens for focusing the image of said original on said photosensitive means, said zoom lens comprising first and second lens groups each having at least one lens element and having a symmetrical configuration with each other with respect to a stop, at least said one lens element of each of said lens groups being moved to change the refractive power of said zoom lens so that the change of the exposure amount on said photosensitive means in association with the change of the focusing magnification is compensated for by the change of refractive power of said lens groups; and slit means for restricting the light incident on said zoom lens from said original, said slit means being disposed between said zoom lens and said original supporting means.

* * * * *

UNITED STATES PATENT AND TRADEMARK OFFICE
CERTIFICATE OF CORRECTION

PATENT NO. : 4,586,814                  Page 1 of 3

DATED : May 6, 1986

INVENTOR(S) : MITSUHIRO TOKUHARA, ET AL.

It is certified that error appears in the above-identified patent and that said Letters Patent is hereby corrected as shown below:

COLUMN 1

Line 61, "move" should read --moved--.

COLUMN 2

Line 9, "2 the" should read --2 show the--;
Line 39, "a the body" should read --the body--;
Line 60, "$K_\beta$ becomes" should read --$K_\beta$ becomes--;

Line 68, "a body etc." should read --the body 1, etc.--.

COLUMN 3

Line 44, "$f_\beta$ of" should read --$f_\beta$ of--;

Line 46, "$1/f_\beta \phi_\beta = 2\beta_S \cdot \beta$" should read --$1/f_\beta \equiv \phi_\beta = 2\beta_S \cdot \phi_\beta$--;

Line 48, "$\phi_\beta$" should read --$\Phi_\beta$--;

Line 49, "$_\beta$" should read --$\phi_\beta$--;

Line 52, "substituted to said" should read --substituted for said--;

Line 62, --(7)-- should be added.

UNITED STATES PATENT AND TRADEMARK OFFICE
CERTIFICATE OF CORRECTION

PATENT NO. : 4,586,814  Page 2 of 3

DATED : May 6, 1986

INVENTOR(S) : MITSUHIRO TOKUHARA, ET AL.

It is certified that error appears in the above-identified patent and that said Letters Patent is hereby corrected as shown below:

COLUMN 4

Line 8, "of $_\beta$" should read --of $\phi_\beta$--;

Line 15, "to $_\beta 2$--" should read --to $\phi_\beta 2$--;

Line 21, "of $_\beta$" should read --of $\phi_\beta$--;

Line 28, "$_\beta 2$" should read --$\phi_\beta 2$--;

Line 31, "$_\beta$" should read --$\phi_\beta$--;

Line 39, "range, consequently," should read --range, and consequently,--;

Line 40, "in usable" should read --in the usable--;

Line 61, "lens;" should read --lens:--.

COLUMN 5

Line 61, "base, photoconductive" should read --base, a photoconductive--.

COLUMN 6

Line 34, "discharge 22" should read --discharger 22--;
Line 36, "discharge 22" should read --discharger 22--;
Line 55, "to scans the" should read --to scan the--;
Line 65, "within" should read --without--;
Lines 66-67, "synchronizing" should read --synchronization--.

UNITED STATES PATENT AND TRADEMARK OFFICE
CERTIFICATE OF CORRECTION

PATENT NO. : 4,586,814
DATED : May 6, 1986
INVENTOR(S) : MITSUHIRO TOKUHARA, ET AL.

It is certified that error appears in the above-identified patent and that said Letters Patent is hereby corrected as shown below:

COLUMN 7

Line 1, "comparing" should read --comparison--.

COLUMN 8

Line 13, "power $_\beta$" should read --power $\phi_\beta$--.

Signed and Sealed this

Twenty-fourth Day of March, 1987

Attest:

DONALD J. QUIGG

Attesting Officer     Commissioner of Patents and Trademarks